United States Patent [19]

Reichow

[11] Patent Number: 5,190,116
[45] Date of Patent: Mar. 2, 1993

[54] DEFLECTION TRANSDUCER FOR MEASURING VEHICLE LOADS AND A SYSTEM FOR MOUNTING SAME

[75] Inventor: Keith W. Reichow, Renton, Wash.
[73] Assignee: Stress-Tek, Inc., Renton, Wash.
[21] Appl. No.: 778,707
[22] Filed: Oct. 18, 1991

Related U.S. Application Data

[62] Division of Ser. No. 479,842, Feb. 13, 1990, abandoned.

[51] Int. Cl.⁵ .......................... G01G 3/14; G01L 1/22; G01B 7/16
[52] U.S. Cl. ................................ 177/211; 73/862.627; 73/862.629; 73/862.638; 338/6
[58] Field of Search .......................... 177/211; 338/6; 73/862.39, 862.65, 862.627, 862.629, 862.638

[56] References Cited

U.S. PATENT DOCUMENTS

| | | | |
|---|---|---|---|
| 3,853,000 | 12/1974 | Barnett et al. | 73/862.65 |
| 3,878,711 | 4/1975 | Randolph, Jr. | 73/862.65 |
| 4,549,439 | 10/1985 | Keen et al. | 73/862.65 |
| 4,957,177 | 9/1990 | Hamilton et al. | 177/211 |

*Primary Examiner*—George H. Miller, Jr.
*Attorney, Agent, or Firm*—Jensen & Puntigam

[57] ABSTRACT

A transducer which includes a central portion (12) having two longitudinally extending parallel rigid beam members (14,16) and two transverse parallel flexure members (30,32) which extend between the two rigid beam members (14,16) at right angles thereto. The rigid beam members (14,16) include end element portions (18,20). Flexure joints (58,60) and mounting portions (62,64) are located longitudinally outboard of the flexure joints (58,60). The flexure members (30,32) each include two cutout portions (34,36,40,42) defining flexure points. Strain gauges (46,48,50,52) are placed in the vicinity of the cutout portions (34,36,40,42) and are electrically connected into a bridge to produce an electrical signal output indicative of the load on the vehicle. The transducer is mounted by means of a mounting element (79) which includes two opposing mounting pad portions (82,84) and an intermediate center portion (86). The mounting pad portions (82,84) are secured to a base member (87) on the vehicle, and then the center section (86) is removed, with the transducer then being securely and precisely connected between the two remaining mounting pad portions (82,84).

12 Claims, 3 Drawing Sheets

DEFLECTION TRANSDUCER FOR MEASURING VEHICLE LOADS AND A SYSTEM FOR MOUNTING SAME

This is a divisional of application Ser. No. 479,842, filed on Feb. 13, 1990 now abandoned.

TECHNICAL FIELD

This invention relates generally to the load measuring transducer art, and more specifically concerns deflection transducers for measuring vehicle loads and mounting means therefor.

BACKGROUND ART

Deflection transducers, such as that shown and described in U.S. Pat. No. 4,042,049 to Reichow, et al., have in the past been used to measure vehicle loads. Such transducers have been manufactured in various forms and configurations, and, in use, are typically positioned on a structural member of the vehicle such as an axle or a structural part of the suspension system. The purpose of using a deflection transducer in such a manner is to obtain a fast and accurate "on-board" indication of vehicle load weight. An onboard weighing system permits convenient measurement of loads at any time, without the necessity of using a conventional scale, at the time of initial loading, or when part of the original load is removed from the vehicle or when a partial new load is added. An onboard system prevents accidental overloads and the possible fines and other inconvenience associated therewith, while insuring that the vehicle is loaded substantially to its permitted capacity whenever possible.

However, conventional onboard weighing systems, including the system shown in the '049 patent, are typically subject to inaccurate or fluctuating results, due to twisting and possibly other movements of the transducer structure caused by normal movement of the vehicle. Such movements are not indicative of vehicle load, but do have an effect on transducer output. Such transducers have also been found to be subject to damage and breakage due to the typically harsh operating environments of such systems, such as, for instance, a logging truck.

Hence, there is a need for a rugged deflection transducer capable of operating in harsh on-board vehicle environments and designed so that it is not responsive to twisting movements, but substantially only to tensile and compression deflection, which provides the desired accurate indication of vehicle load.

The mounting of such transducers is also an important factor relative to the accuracy of the transducer results and its performance in general. Specialized devices are known, such as shown in U.S. Pat. No. 4,102,031 to Reichow, et al., for insuring that the mounting elements for the transducer are spaced apart a selected distance and have a particular configuration in order to properly receive the transducer. However, present devices, including the one shown in the '031 patent, and the described methods for their use, have not provided completely satisfactory results, as imprecise positioning of the mounting elements can still occur, which in turn will result in poor performance of the transducer when the transducer is connected to the mounting elements.

Hence, there is also a need for a transducer mounting structure which will insure precise positioning of the transducer structure.

DISCLOSURE OF THE INVENTION

Accordingly, the present invention is a transducer for measuring vehicle loads, including two rigid, substantially parallel beam members, which extend toward each other from opposing end element portions of the transducer, and at least one flexure member which has flexure portions and which extends between and is attached to said rigid members, wherein the flexure members are sensitive to axial tension and compression forces, but relatively insensitive to twisting forces. The transducer further includes strain sensing means secured to the flexure member in the vicinity of the flexure portions thereof, providing an electrical signal output corresponding to the axial deflection of the flexure member and hence an indication of the load on the vehicle.

In another feature of the present invention, a mounting member for a deflection transducer is provided, wherein the transducer includes fastening means a predetermined distance apart. The mounting member is a rigid, one-piece mounting element which includes mounting pad portions located at opposite ends of the mounting element and an intermediate center portion extending therebetween. The mounting pad portions include a lower surface which is adapted to be permanently secured to a base member on a vehicle or the like, wherein the mounting pad portions further include receiving means for the fastening means on the transducer, to permit attachment of the transducer to the mounting member and wherein the mounting member is adapted and configured so as to permit the convenient removal of a center portion thereof without changing the distance or the alignment between the respective mounting pad portions prior to the attachment of the transducer to the mounting member.

In yet another feature of the present invention, a method of mounting a deflection transducer on a structural base member such as a vehicle or the like is provided, wherein the transducer includes first and second spaced-apart fastening means. The method includes the initial step of securing a one-piece mounting member to the base member, wherein the mounting member includes mounting pad portions at opposite ends thereof and an intermediate center portion extending therebetween, the mounting pad portions including means for receiving, respectively, the first and second fastening means of the transducer. In the next step, the center portion of the mounting member is removed, leaving the two mounting pad portions secured to the base member, wherein the mounting pad portions retain their initial exact orientation relative to each other following the removal of the center portion. The third step is securing the transducer to the mounting pad portions by the fastening means on the transducer and the receiving means on the mounting pad portions.

BEST MODE FOR CARRYING OUT THE INVENTION

Figure 1:
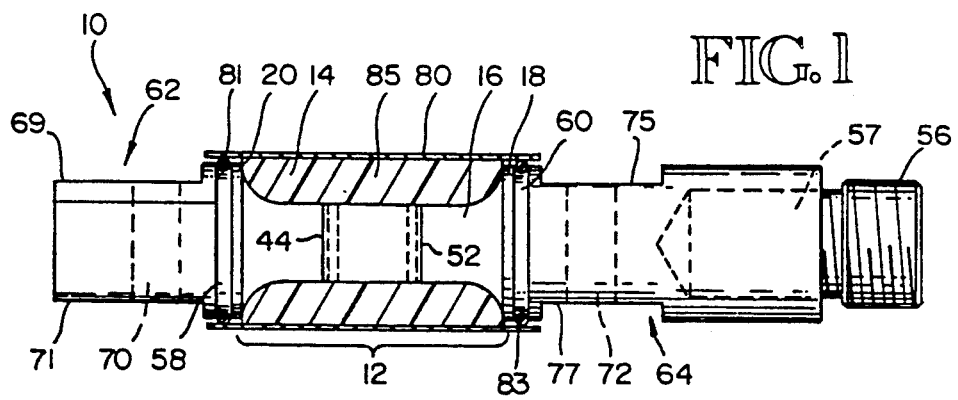
FIG. 1 is a top view of the transducer of the present invention.
Figure 2:
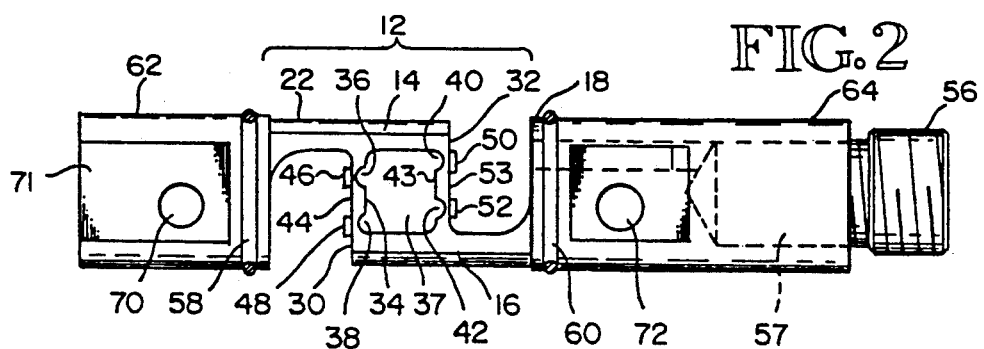
FIG. 2 is a side elevational view of the transducer of FIG. 1.
Figure 3:
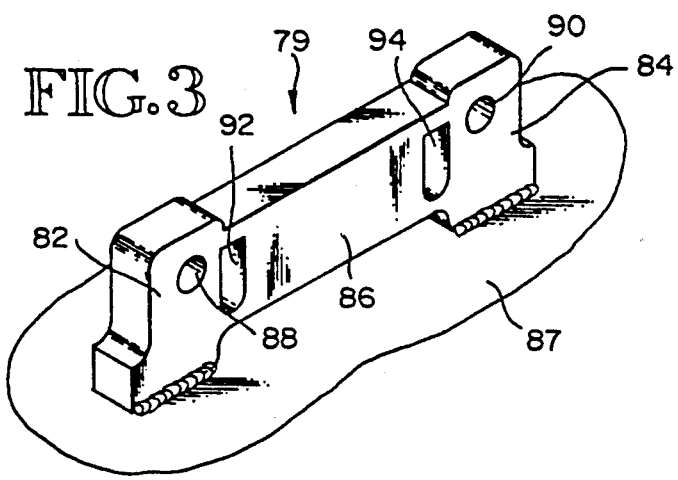
FIG. 3 is a schematic view showing the mounting element of the present invention secured to a structural member, as a result of the first step in the process of mounting the transducer of FIG. 1.
Figure 4:
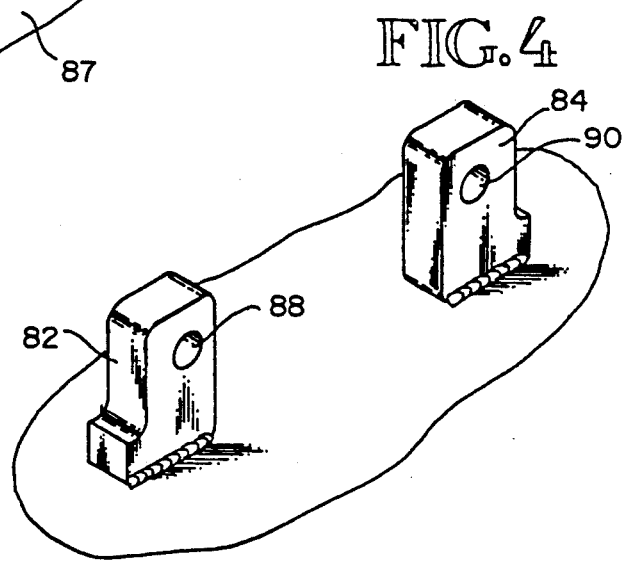
FIG. 4 shows the result of the second step in the transducer mounting process of the present invention, using the mounting element of FIG. 3.
Figure 5:
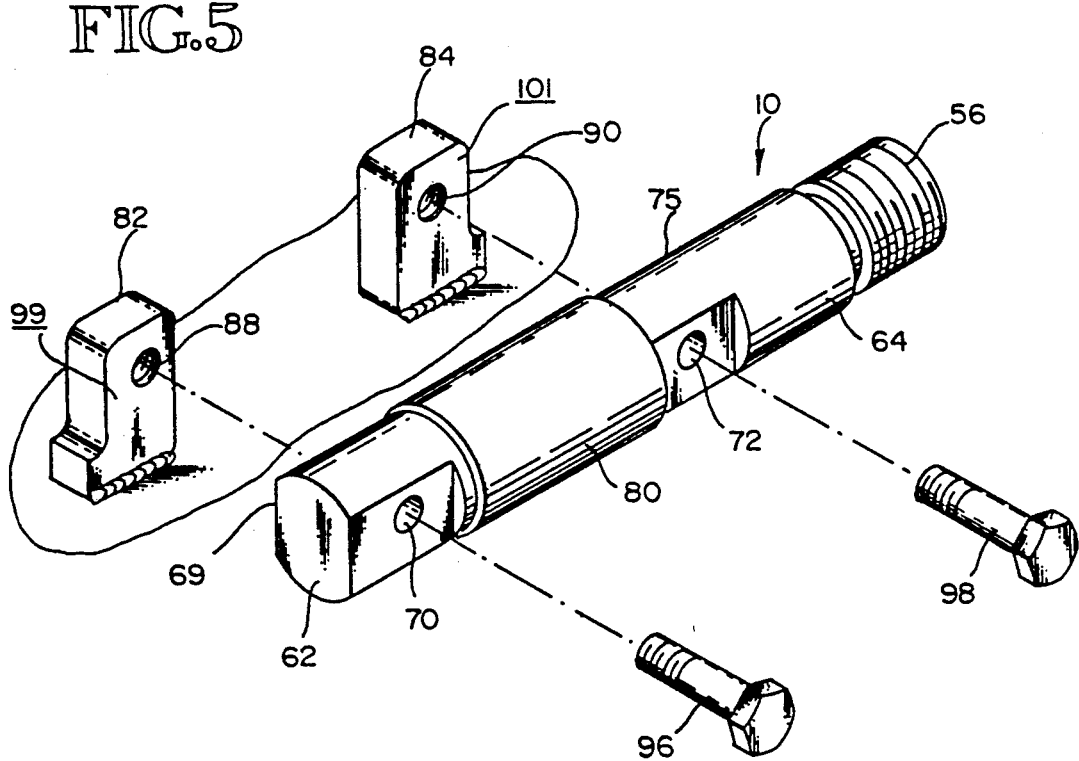
FIG. 5 shows the third step in the transducer mounting process of the present invention, in which the transducer of FIG. 1 is attached to the remaining mounting structure shown in FIG. 4.
Figure 6:
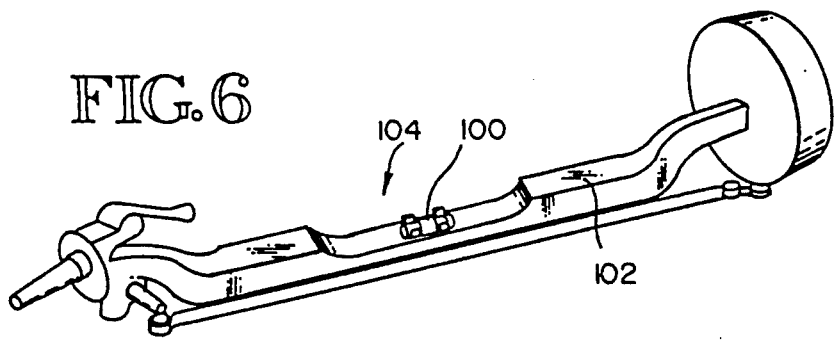
FIG. 6 shows one mounting position for the transducer of the present invention on a vehicle.
Figure 7:
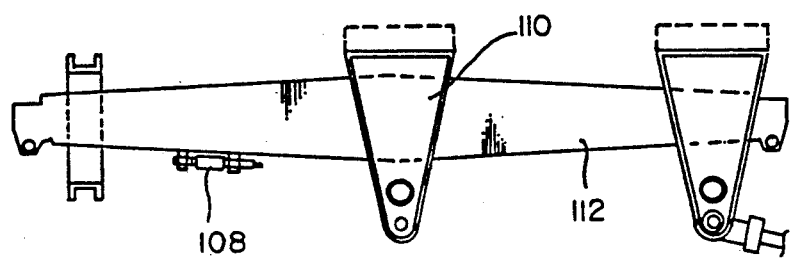
FIG. 7 shows another mounting position for the transducer of the present invention on a vehicle.
Figure 8:
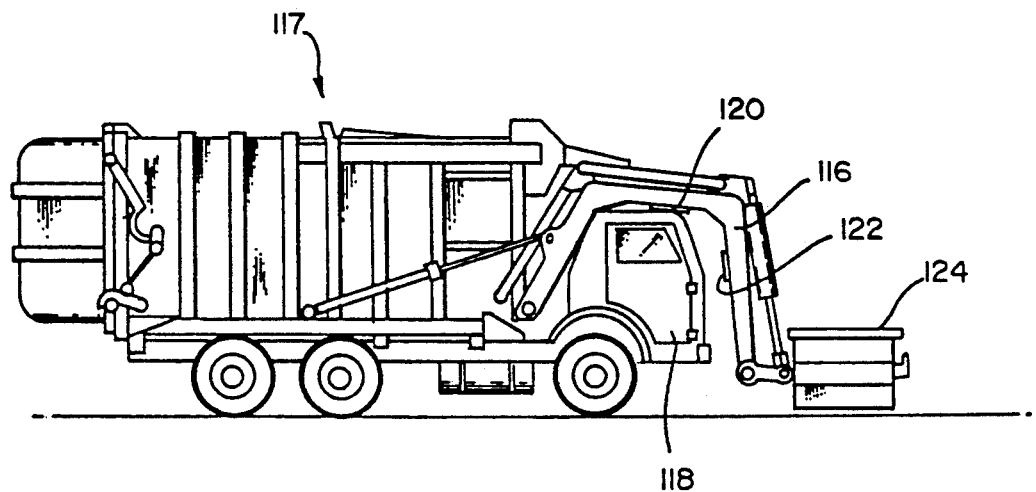
FIG. 8 shows the use of the transducer of the present invention in a front end loader type of vehicle.

FIGS. 1 and 2 show the transducer 10 of the present invention. In use, the transducer 10 will typically be mounted on a structural portion or member of a vehicle such as a tractor/trailer combination or a refuse truck, in order to measure the load thereon. Examples of particular locations for mounting the transducer are shown in FIGS. 6, 7 and 8 and are explained in more detail in the following paragraphs. FIGS. 3-5 show a sequence of steps in the mounting of the transducer on the vehicle and a particular mounting element used therefor. These steps and the mounting element are also explained in more detail in following paragraphs.

Referring to FIG. 1, the transducer 10 includes a central body portion 12. The body portion 12 in the embodiment shown includes two parallel rigid beam elements 14 and 16 which extend in the longitudinal direction of the transducer 10. The rigid beam elements 14,16 include end portions 18 and 20 which define the opposing ends of central body portion 12, and which, in the embodiment shown, are circular in configuration, approximately 1" in diameter and are arranged at right angles to the beam elements 14,16. The rigid beam elements 14,16 in the embodiment shown are each approximately 1⅛ inches long by ½ inch wide and approximately ¼ inch thick. The outer surface of each beam element, i.e. surface 22 of beam 14, is curved to match the curved peripheral edge of its associated end portion. The beam elements 14 and 16 are separated by approximately ¼ inch, extending toward and overlapping each other by approximately ⅜ inch. The configuration and the material of the beam elements 14,16 are such that the beam elements are substantially rigid.

Connecting the two beam elements 14 and 16 in the embodiment shown are two parallel flexure elements 30 and 32. While the embodiment of FIGS. 1 and 2 show two flexure elements, it should be understood that a greater number of flexure elements could be used. Also, in some applications, a single flexure element could be used. The flexure elements 30 and 32 extend, respectively, at right angles from the free ends of the respective beam elements 14 and 16 to the opposing beam element. The flexure elements 30 and 32 are parallel to each other, are approximately ¼ inch apart and approximately ¼ inch long. Flexure elements 30 and 32 and outermost portions of beam elements 14 and 16 define an approximately square central opening 37 in central body portion 12.

the surfaces of flexure elements 30 and 32 which face opening 37 are referred to as interior surfaces. In interior surface 34 of flexure element 30 are two cutout portions 36 and 38 in the form of semicircular grooves which extend for the full width of flexure element 30. Similar cutout portions 40 and 42 are provided in the interior surface 43 of flexure element 32. Interior surfaces 34 and 43 face each other. The thickness of the respective flexure elements 30 and 32 at the cutout portions is approximately 1/32 inch. It is these relatively thin portions which provide the required flexing capability for flexure elements 30 and 32.

Mounted on the opposing exterior surface 44 relative to interior surface 34 of flexure element 30 are two conventional strain gauge elements 46 and 48. These are mounted at approximately the point where the flexure element 30 is the thinnest, i.e. behind the cutout portions thereof. In a similar fashion and position, strain gauges 50 and 52 are mounted on the exterior surface 53 of flexure element 32. Strain gauges 46, 48, 50, and 52 are adapted to measure the axial tension and compression loads on the flexure elements 30 and 32, due to the load on the vehicle. The particular transducer arrangement shown is resistant to twisting and bending loads, such that the movement of the flexure elements 30 and 32 is due substantially only to axial tension and compression loads and thus is accurately reflective of the actual vehicle load.

In the embodiment shown, each of the strain gauges produces an electrical output. The strain gauges are connected in the form of a conventional Wheatstone bridge with gauges 48 and 50 being in tension, while gauges 46 and 52 are in compression. The electrical output from the strain gauges is applied through leads (not shown) to the Wheatstone bridge arrangement (not shown) which is positioned in a cavity 57 in one mounting portion of the transducer. The bridge output signal is applied to an external connector 56 at one end of the transducer. An electrical connector line extends between the transducer, in particular the connector 56 and a vehicle onboard computational electronics and display element (not shown) which will provide the actual indication of load weight. The computational circuit and the display, typically located in the vehicle cab, are conventional and therefore not discussed in detail herein.

Besides the central body portion 12, the transducer includes two transducer flexure joints 58 and 60, which are located immediately outboard from end portions 18 and 20 of central body portion 12. The flexure joints 58 and 60 are defined by shallow lateral grooves in the body of the transducer. The grooves are approximately ¼ inch wide and 1/32 inch - 1/16 inch deep, such that the diameter of the transducer body at those points is approximately 7/8 inch. Immediately outboard of flexure joints 58 and 60 are transducer mounting portions 62 and 64, which are cylindrical in general configuration, extending in the longitudinal direction of the transducer, with each mounting portion including two opposing flat sections through which lateral openings are provided. Flat sections 69 and 71 are provided in mounting portion 62 with opening 70 extending therethrough, as shown in FIGS. 1 and 2. Flat sections 69 and 71 extend for the full length of mounting portion 62, approximately 1 inch. Flat sections 75 and 77 in mounting section 64 extend for approximately 3/4 inch from the inboard end thereof (adjacent flexure joint 60), with opening 72 extending therethrough. Mounting portion 64 extends for another 1 inch beyond the outboard end of the flat sections 75 and 77, accommodating the cavity 57 which houses the Wheatstone bridge circuit.

In the embodiment shown, the entire transducer 10, including the central body portion, the flexure joints and the mounting portions comprises a single piece of material, such as steel or aluminum, machined in accordance with the above specifications. It should be understood, however, that the transducer may be constructed somewhat differently within the spirit of the invention.

The transducer of the present invention further includes a system for sealing the central body portion against environmental hazards such as weather and the like. It includes a cylindrical tube element 80 approximately 2.2 inches long, which is substantially the same length as the combined length of the central body portion 12 and the two flexure joints 58 and 60. The interior diameter of the tube 80 is slightly greater than the exterior diameter of end portions 18 and 20. O-rings 81 and 83 are positioned in the grooves comprising flexure joints 58 and 60 and are slightly compressed when the tube 80 is fitted into place over the body portion 12, thereby firmly holding the tube 80 in place. The interior space between the tube 80 and the body portion 12 of the transducer is typically filled with gel material 85 in order to provide additional environmental protection.

As indicated above, it is extremely important to the proper operation of a transducer such as that described above, that it e mounted with precision. In practice, precise mounting of such transducers has proven to be difficult to achieve. FIGS. 3, 4, and 5 show a method and a device used to achieve a precise mounting of the transducer of FIGS. 1 and 2. FIG. 3 shows the mounting element 79 of the present invention. Mounting element 79 includes in the embodiment shown two mounting pad portions 82 and 84 at the opposing ends thereof, and a center portion 86 which connects the two mounting pad portions 82 and 84. The mounting element 79 is elongated, approximately 4 inches long at its longest point, approximately 1¼ inches high at its highest point and approximately 5/16 inches thick. Mounting element 79 is quite rigid and is made out of steel or similar material.

The center portion 86 is approximately ⅞ inch high, so that when the mounting element 79 is in its upright position, as shown in FIG. 3, there is a small space between the center portion 86 and a base member 87 on which the mounting element 79 rests. Each of the mounting pad portions 82 and 84 have openings 88 and 90 therethrough, which can accommodate a mounting bolt or the like. In the embodiment shown, the openings 88,90 have a diameter of 5/16 inch. Also in the mounting element 79 are a pair of cutout portions 92,94 at the extreme ends of the center portion 86, such that there remains only relatively thin sections of the center portion 86 at the top and bottom of cutout portions 92 and 94.

In order to mount the transducer of FIGS. 1 and 2 on a base member such as a vehicle using the mounting element 79, mounting element 79 is first secured to the base member 87 by welding the bottom edge of each mounting pad portion 82 and 84 to the base member. This provides a strong, secure attachment of the mounting element to the base member.

Next, the center portion 86 of the mounting element is removed. The cutout portions 92,94 are helpful since a substantial amount of material which would otherwise have to be cut through is eliminated. After center portion 86 is removed, only the two mounting pad portions 82 and 84 remain, as shown in FIG. 4. However, mounting pad portions 82 and 84 do remain in the same precise relative position as when the mounting element 79 as a whole was secured to the base member.

FIG. 5 shows the next and final step in the process for mounting the transducer 10 to the mounting pad portions 82 and 84. The mounting is accomplished by means of conventional bolts 96 and 98. The bolts extend through the openings 70 and 72 in the transducer and also through the openings 88 and 90 in the mounting pad portions 82 and 84. The flat sections 69 and 75 abut the vertical surfaces 99,101 of the mounting pad portions. A nut is attached to each of the threaded bolts and tightened on the bolts so that the transducer 10 is securely attached to the mounting pad portions. It should be understood, however, that other fastening means besides bolts could be used to physically secure the transducer 10 to the mounting pad portions.

The advantage of the mounting process shown in FIGS. 3 through 5 is that the mounting pad portions to which the transducer is attached maintain a precise alignment during the securing of the mounting element as a whole to the base member. The configuration of the mounting element and the process itself eliminates any necessity of having to align and realign the two mounting pad portions during installation thereof.

At the conclusion of the process shown in FIGS. 3 through 5, the transducer is mounted and ready for operation. A load on the vehicle will cause the transducer to flex in both tension and compression, focused in the area where the strain gauges 46, 48, 50, and 52 are mounted on the flexure beam portions of the transducer. The bending effect on those flexure points will be due substantially entirely to axial tension and compression, and not to bending and twisting moments. Hence, an accurate indication of the load is much more likely than with previous systems which were subject to said twisting moments.

FIGS. 6, 7, and 8 show three possible locations for mounting the transducer of the present invention on a vehicle. FIGS. 6 and 7 show the use of the transducer in two different locations on a tractor/trailer. FIG. 6 shows the transducer 100 mounted directly on the upper surface 102 of a front axle 104 of a truck. This arrangement will measure loads on the front axle. FIG. 7 shows a transducer 108 mounted on a portion of the suspension system of the trailer portion of the vehicle. FIG. 7 shows simply an equalizer hanger element 110 and equalizer 112. In the embodiment of FIG. 7, the transducer 108 is mounted on the lower surface of the equalizer 112. The transducer arrangement shown in FIG. 7 will measure loads on the tandem axles to which the suspension system of FIG. 7 is connected.

FIG. 8 shows the transducer of the present invention mounted on the forward lift arms 116 of a refuse truck 117. Such a vehicle will have lift arms on both sides of the cab 118 of the truck. Possible locations for the transducer are shown in FIG. 8. Two possible transducer locations are shown. Transducer 120 is shown on the interior surface of an intermediate section of the lift arm 116 while transducer 122 is shown on a forward section of the lift arm. One deflection transducer will be mounted on each lift arm. The deflection of the arm 116 at a particular point in the lift cycle is proportional to the weight of a container 164 being lifted (and dumped), and thus would be measured by the transducer.

Other locations on various vehicles may certainly also be used for the transducer of the present invention.

Although a preferred embodiment of the invention has been disclosed herein for illustration, it should be understood that various changes, modifications, and substitions may be incorporated in such embodiment without departing from the spirit of the invention as defined by the claims which follow:

I claim:

1. A transducer for measuring vehicle loads, comprising:
   two rigid, substantially parallel, spaced-apart beam members, extending toward and overlapping each other from opposing end element portions thereof in a longitudinal direction of the transducer;
   at least two flexure members, having flexure portions, said flexure members extending between and attached to said rigid beam members, spaced apart in the longitudinal direction of the transducer, said flexure members being sensitive to axial tension and compression forces but relatively insensitive to twisting forces; and
   strain sensing means secured to said flexure members in the vicinity of the flexure portions thereof, providing an electrical signal output corresponding to the axial deflection of the flexure members and hence an indication of the load on the vehicle.

2. An apparatus of claim 1, wherein the at least two substantially parallel flexure members extend between said rigid beam members at substantially right angles thereto, wherein the flexure portions in each flexure member include at least two cutout portions which extend across the width thereof, and wherein the strain sensing means are located in the vicinity of said flexure portions.

3. An apparatus of claim 2, wherein the transducer includes mounting portions which extend away from the end element portions of the rigid beam members, and wherein the two mounting portions include openings therein for attachment of the transducer to a mounting member.

4. An apparatus of claim 3, including a narrow flexure joint between the end element portions of the rigid beam members and the mounting portions of the transducer.

5. An apparatus of claim 4, wherein the thickness of the end element portions is approximately equal to the thickness of the flexure joints.

6. An apparatus of claim 2, wherein the two rigid members extend in the longitudinal direction of the transducer while the flexure members extend in the lateral direction thereof.

7. An apparatus of claim 6, wherein one flexure member extends from an otherwise free end of one rigid beam member, while the other flexure member extends from an otherwise free end of the other rigid beam member.

8. An apparatus of claim 2, wherein there is a substantial distance between the flexure members and end portions of the rigid beam members.

9. An apparatus of claim 8, wherein the distance between the flexure members is substantially equal to the distance between the flexure members and the end portions of the rigid beam members and to the distance between the rigid beam members.

10. An apparatus of claim 1, including means for sealing the rigid beam members and the flexure members against the environment.

11. An apparatus of claim 10, wherein the sealing means comprises a pair of "O" rings positioned in the flexure joints and a tube-like element which extends between the two "O" rings, the internal diameter of the tube-like element being of such a size relative to the diameter of the "O" rings that the "O" rings are in compression when the tube element is in place.

12. An apparatus of claim 11, wherein the area between the tube-like member and the transducer is filled with gel.

* * * * *